United States Patent
Yamashita et al.

(10) Patent No.: US 9,353,624 B2
(45) Date of Patent: May 31, 2016

(54) SCROLL COMPRESSOR

(71) Applicant: KABUSHIKI KAISHA TOYOTA JIDOSHOKKI, Kariya-shi, Aichi (JP)

(72) Inventors: Takuro Yamashita, Kariya (JP); Ken Suitou, Kariya (JP); Kazuhiro Kuroki, Kariya (JP); Satoru Egawa, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 14/409,739

(22) PCT Filed: Jun. 25, 2013

(86) PCT No.: PCT/JP2013/067302
§ 371 (c)(1),
(2) Date: Dec. 19, 2014

(87) PCT Pub. No.: WO2014/002970
PCT Pub. Date: Jan. 3, 2014

(65) Prior Publication Data
US 2015/0152731 A1    Jun. 4, 2015

(30) Foreign Application Priority Data
Jun. 27, 2012 (JP) ................................. 2012-144131

(51) Int. Cl.
F04C 18/02    (2006.01)
F04C 23/00    (2006.01)
(Continued)

(52) U.S. Cl.
CPC ............. *F01C 21/02* (2013.01); *F04C 18/0215* (2013.01); *F04C 29/0057* (2013.01);
(Continued)

(58) Field of Classification Search
CPC .. F01C 21/02; F04C 18/0215; F04C 29/0057; F04C 2240/50; F04C 2240/56; F04C 23/008; F16C 17/02; F16C 17/18; F16C 35/02

USPC ................................................ 418/55.1–55.6
See application file for complete search history.

(56) References Cited

U.S. PATENT DOCUMENTS 5,727,935 A    3/1998  Shigeoka et al.
2003/0152472 A1  8/2003  Kiem et al.
(Continued)

FOREIGN PATENT DOCUMENTS

JP    8-93666 A    4/1996
JP    10-141256 A    5/1998
(Continued)

OTHER PUBLICATIONS

International Preliminary Report on Patentability issued by the International Searching Authority in counterpart International application No. PCT/JP2013/067302, mailed Jan. 8, 2015.
(Continued)

*Primary Examiner* — Jorge Pereiro
*Assistant Examiner* — Dapinder Singh
(74) *Attorney, Agent, or Firm* — Sughrue Mion, PLLC

(57) ABSTRACT

In a motor-driven scroll compressor of the present invention, a double-sided sliding bearing is provided a space between a drive bush and a boss portion. The double-sided sliding bearing has a cylindrical outer sliding member that is provided in the boss portion, and a cylindrical inner sliding member that is provided in the bush portion. In an outer boundary zone of an inner circumferential surface of the boss portion and an outer circumferential surface of the outer sliding member, and an inner boundary zone of an inner circumferential surface of the inner sliding member and an outer circumferential surface of the bush portion, relative rotation is generated. The outer sliding member and the inner sliding member have different lengths in an axial direction, and thereby form a first and a second steps at both ends in the axial direction.

13 Claims, 10 Drawing Sheets

(51) Int. Cl.
*F01C 21/00* (2006.01)
*F01C 21/02* (2006.01)
*F16C 17/02* (2006.01)
*F04C 29/00* (2006.01)
*F16C 17/18* (2006.01)
*F16C 35/02* (2006.01)

(52) U.S. Cl.
CPC .............. *F16C17/02* (2013.01); *F16C 17/18* (2013.01); *F16C 35/02* (2013.01); *F04C 23/008* (2013.01); *F04C 2240/50* (2013.01); *F04C 2240/56* (2013.01)

(56) References Cited

U.S. PATENT DOCUMENTS

2010/0183453 A1*  7/2010  Milliff ................ F04C 18/0215
                                                          417/310
2010/0196184 A1*  8/2010  Ni ......................... F01C 19/005
                                                          418/55.5
2010/0221134 A1*  9/2010  Kanaizumi ......... F04C 18/0215
                                                          418/55.1

FOREIGN PATENT DOCUMENTS

| | | |
|---|---|---|
| JP | 11-277168 A | 10/1999 |
| JP | 2003-239876 A | 8/2003 |
| JP | 2008-14185 A | 1/2008 |
| WO | 2010/111134 A2 | 9/2010 |
| WO | 2014/002970 A | 1/2014 |

OTHER PUBLICATIONS

International Search Report for PCT/JP2013/067302 dated Oct. 1, 2013 [PCT/ISA/210].

* cited by examiner

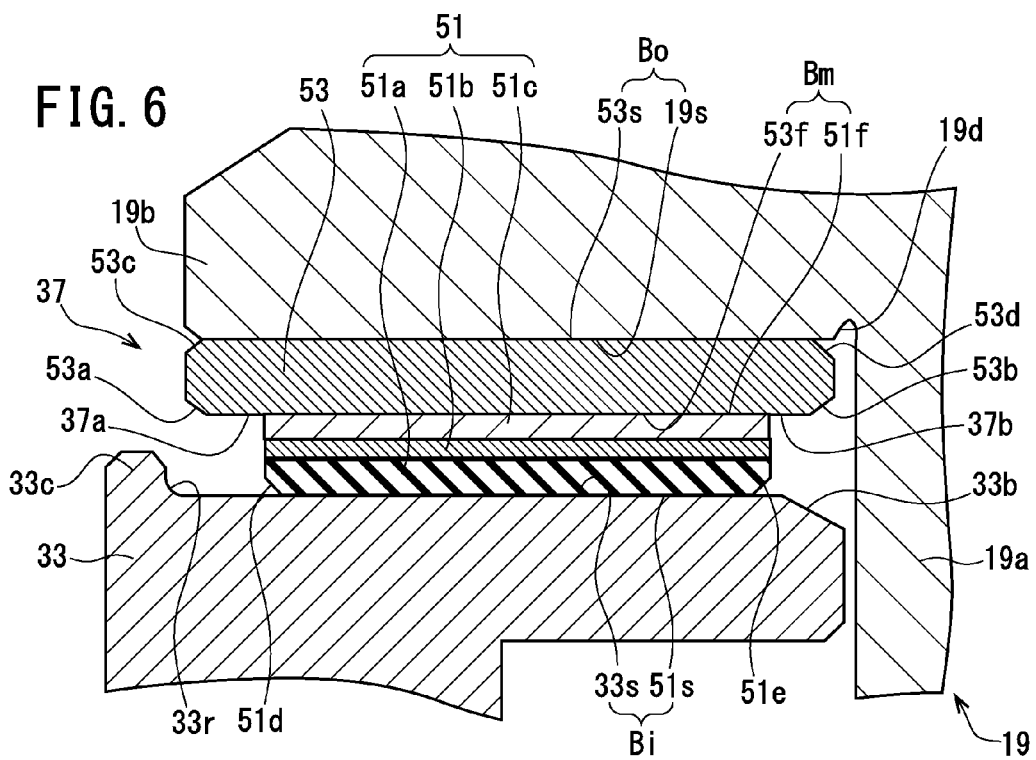
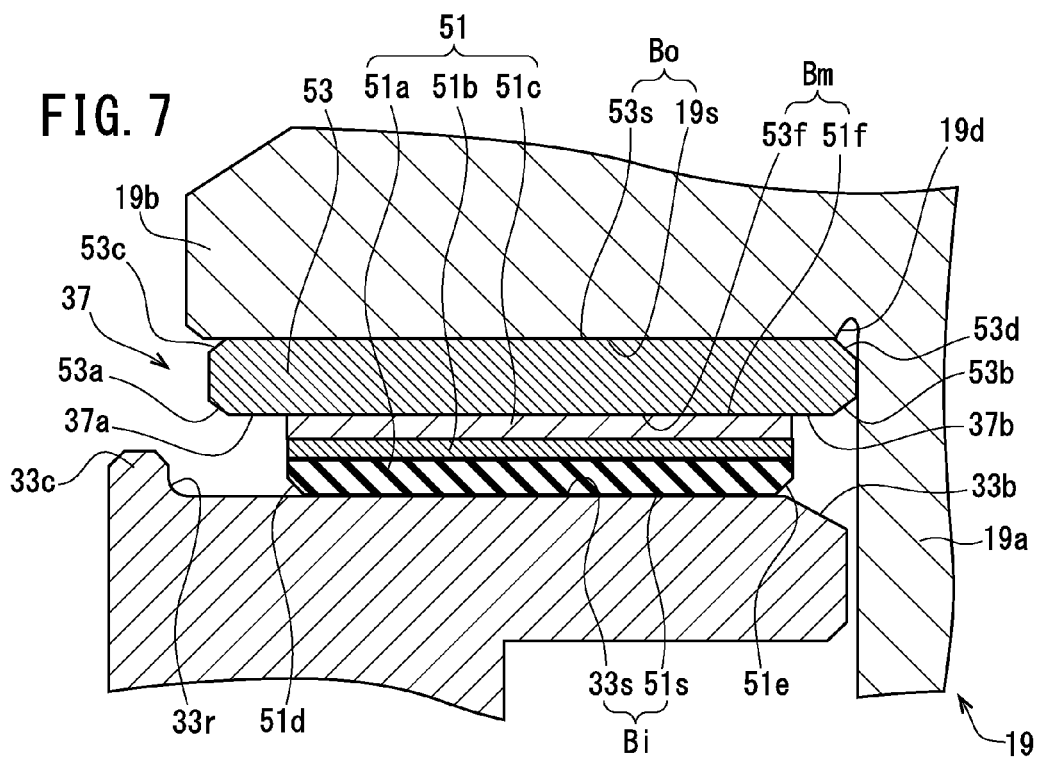

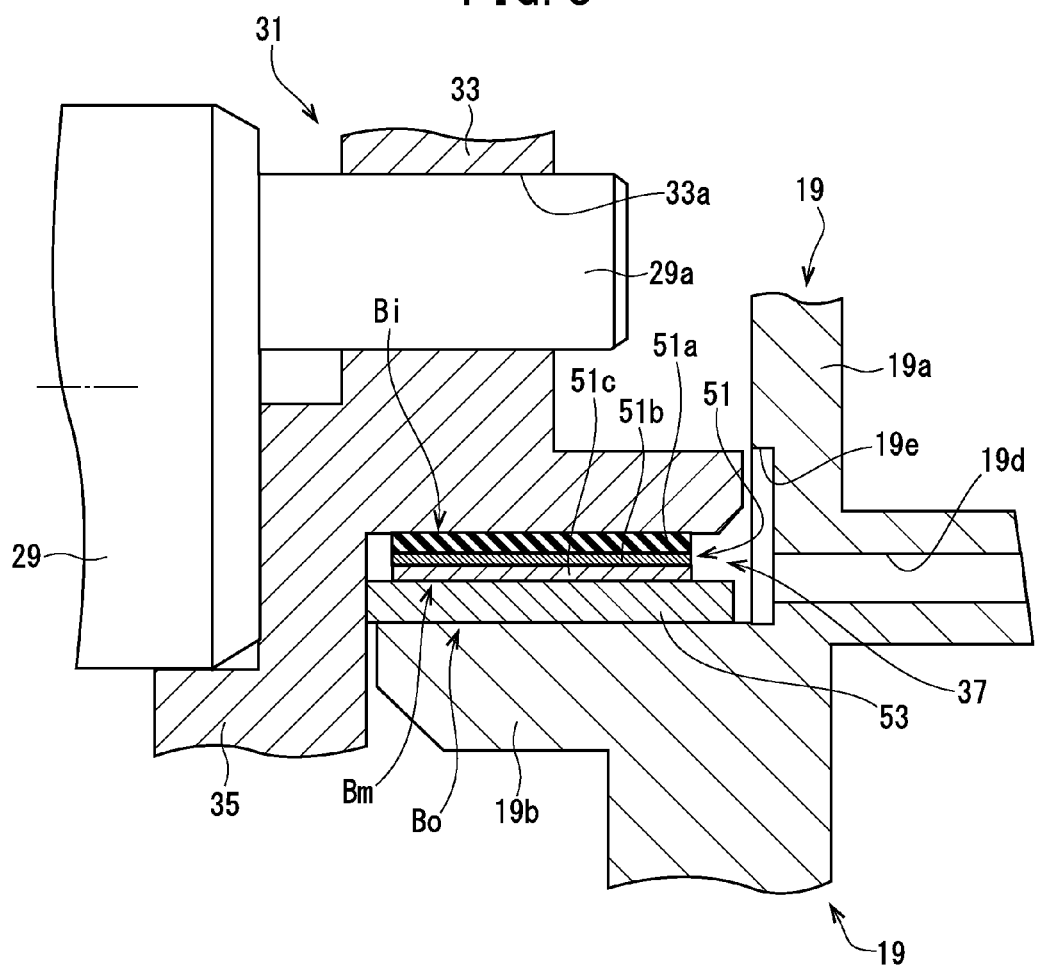

ary fit between the outer sliding member and the outer bearing-receiving portion, the clearance-fit between the outer sliding member and the outer bearing-receiving portion, and the clearance-fit between the outer sliding member and the outer bearing-receiving portion.

SCROLL COMPRESSOR

CROSS REFERENCE TO RELATED APPLICATIONS

This application is a National Stage of International Application No. PCT/JP2013/067302, filed on Jun. 25, 2013, which claims priority from Japanese Patent Application No. 2012-144131, filed on Jun. 27, 2012, the contents of all of which are incorporated herein by reference in their entirety.

TECHNICAL FIELD

The present invention relates to a scroll compressor.

BACKGROUND ART

Patent Literature 1 discloses a conventional scroll compressor. The scroll compressor comprises a housing, a fixed scroll that is fixed to the housing, and a movable scroll that forms a compression chamber between the movable scroll and the fixed scroll. A boss portion is formed in the movable scroll, and a drive shaft is axially supported at the housing rotatably around a drive shaft axis.

At the drive shaft, an eccentric shaft portion that is eccentric from the drive shaft axis is protrudingly provided to be rotatable integrally with the drive shaft. A drive bush is fitted in between the eccentric shaft portion and the boss portion. Roller bearings are provided in a space between the drive bush and the boss portion, and in a space between one end portion at the drive bush side in the drive shaft and the housing.

In this scroll compressor, the drive shaft rotates around the drive shaft axis, whereby the drive bush is driven around the drive shaft axis while pivoting around the eccentric shaft portion, and the movable scroll orbits. Therefore, the compression chamber reduces in the capacity as the compression chamber is moving to the inner side from the outer side, and therefore, the compression chamber sucks a refrigerant gas from a suction chamber, compresses the refrigerant gas and discharges the refrigerant gas to a discharge chamber.

CITATION LIST

Patent Literature

Patent Literature 1: Japanese Patent Laid-Open No. 10-141256

SUMMARY OF INVENTION

Technical Problem

However, in the above described conventional scroll compressor, the roller bearings are adopted between the drive bush and the boss portion, and between the one end portion of the drive shaft and the housing, and reduction in manufacture cost is difficult.

Therefore, it is conceivable to make at least one of these bearings a sliding bearing which is a cylindrical sliding member. In this case, it is general to press-fit the outer circumferential surface of the sliding bearing into an outer bearing-receiving portion that serves as a boss portion or a housing, and clearance-fit the inner circumferential surface of the sliding bearing onto an inner bearing-receiving portion that serves as a drive bush or one end portion of a drive shaft.

However, when the sliding bearing is adopted to the space between the drive bush and the boss portion, or the space between the one end portion of the drive shaft and the housing, an excessively large load temporarily acts on a specific portion of the sliding bearing from the eccentric shaft portion and local abrasion easily occurs to the sliding bearing, under the severe conditions where the scroll compressor is intermittently operated, the rotational speed of the scroll compressor varies, and liquid compression occurs. In this case, there arises concern about durability of the scroll compressor.

The present invention is made in the light of the above described conventional circumstances, and the problem to be solved by the present invention is to provide a scroll compressor that realizes reduction in manufacture cost, and can exhibit excellent durability even when the scroll compressor is used under severe conditions.

Solution to Problem

A scroll compressor of the present invention is a scroll compressor comprising a housing, a fixed scroll that is fixed to the housing, a movable scroll that forms a compression chamber between the movable scroll and the fixed scroll, a boss portion that is formed at the movable scroll, a drive shaft axially supported at the housing rotatably around a drive shaft axis, an eccentric shaft portion that is eccentric from the drive shaft axis and is rotatable integrally with the drive shaft, and a drive bush that is fitted onto the eccentric shaft portion and is fitted into the boss portion, and causes the movable scroll to orbit with respect to the fixed scroll, wherein a motor mechanism that drives the drive shaft is provided in the housing, the movable scroll has a movable base plate in which the boss portion is formed in a center, and a movable spiral wall that has a spiral shape and extends in a direction opposite to the boss portion from the movable base plate, a bearing is provided in at least one of a space between the drive bush and the boss portion, and a space between one end portion at the drive bush side in the drive shaft and the housing, the bearing has a cylindrical outer sliding member that is provided at an outer bearing-receiving portion that serves as the boss portion or the housing, and a cylindrical inner sliding member that is provided at a said of an inner bearing-receiving portion side that serves as the drive bush or the one end portion of the drive shaft, an outer boundary zone is defined by an inner circumferential surface of the outer bearing-receiving portion and an outer circumferential surface of the outer sliding member, a middle boundary zone is defined by an inner circumferential surface of the outer sliding member and an outer circumferential surface of the inner sliding member, an inner boundary zone is defined by an inner circumferential surface of the inner sliding member and an outer circumferential surface of the inner bearing-receiving portion, wherein at least two boundary zones of the outer boundary zone, middle boundary zone, and inner boundary zone, relative rotation is generated ,and the outer sliding member and the inner sliding member have different lengths in an axial direction, and thereby form a step in at least one end in the axial direction, a main bearing that serves as the bearing is provided in the pace between the boss portion which is the outer bearing-receiving portion of the drive bush which is the inner bearing-receiving portion, the drive bush has a chamfer in at least one of both ends in the axial direction, and movement restriction means that restricts the inner sliding member from moving to the chamfer is provided between the outer sliding member and movable scroll, or between the outer sliding member and the drive bush.

In the scroll compressor of the present invention, the bearing which provided with the cylindrical outer sliding member and the cylindrical inner sliding member is adopted in at least one of the space between the drive bush and the boss portion, and the space between the one end portion of the drive shaft and the housing. The outer sliding member is provided at the side of the outer bearing-receiving portion which is the boss portion or the housing. The inner sliding member is provided at the side of the inner bearing-receiving portion which is the drive bush or the one end portion of the drive shaft. Therefore, reduction in manufacture cost is enabled.

Further, in this scroll compressor, at least in the two boundary zones of the outer boundary zone, the middle boundary zone and the inner boundary zone of the bearing, relative rotation is generated. The outer boundary zone refers to the boundary zone of the inner circumferential surface of the outer bearing-receiving portion and the outer circumferential surface of the outer sliding member. The middle boundary zone refers to the boundary zone of the inner circumferential surface of the outer sliding member and the outer circumferential surface of the inner sliding member. The inner boundary zone refers to the boundary zone of the inner circumferential surface of the inner sliding member and the outer circumferential surface of the inner bearing-receiving portion. Therefore, even when the scroll compressor is used under severe conditions, and an excessively large load temporarily acts on the bearing from the eccentric shaft portion, at least in the two boundary zones relative rotation occurs by the load, and can release the load. Therefore, local abrasion hardly occurs to the bearing.

Especially in this scroll compressor, the outer sliding member and the inner sliding member form the step in at least one end in the axial direction, and a lubricating oil is easily held in the step by a capillary phenomenon. Therefore, the lubricating oil is easily supplied to at least the two boundary zones, and these boundary zones easily generate relative rotation.

Accordingly, the scroll compressor of the present invention realizes reduction in manufacture cost, and can exhibit excellent durability even under severe conditions.

The reason why it is preferable that the bearing according to the present invention is provided in the space between the drive bush and the boss portion is that the drive bush and the boss portion is susceptible to a large load by the eccentric shaft portion.

As at least one of the outer sliding member and the inner sliding member, a material or a component having characteristics such as low frictional properties, abrasion resistance, fatigue resistance, seizure resistance and conformability can be adopted. As a material of a single layer structure, a resin or the like which is excellent in the sliding characteristics such as a fluorine resin can be used, besides a tin-base alloy, a lead-base alloy, a copper-lead alloy, a lead-bronze alloy, an aluminum-tin alloy, an aluminum-tin-silicon alloy, and an aluminum-zinc alloy. A component of a two-layer structure or a three-layer structure also can be adopted. Between the outer sliding member and the inner sliding member, a bonding layer for bonding both of them also can be provided. Further, one of the outer sliding member and the inner sliding member may be plating or coating which is applied onto the inner circumferential surface or the outer circumferential surface of the other one.

The movable scroll can have a movable base plate in which the boss portion is formed in a center, and a movable spiral wall that has a spiral shape and extends in a direction opposite to the boss portion from the movable base plate. A main bearing that serves as the bearing according to the present invention can be provided in the space between the boss portion which is the outer bearing-receiving portion and the drive bush which is the inner bearing-receiving portion. The step of the main bearing is preferably located in a vicinity of the movable base plate. The lubricating oil is difficult to supply to deep inside of the boss portion, but if the step of the main bearing is located in the vicinity of the movable base plate, the step favorably holds the lubricating oil at the side of the deep inside of the boss portion, and the main bearing favorably generates relative rotation.

A motor mechanism that drives the drive shaft can be provided in the housing. A main bearing that serves as the bearing according to the present invention can be provided in the space between the boss portion which is the outer bearing-receiving portion and the drive bush which is the inner bearing-receiving portion. The step of the main bearing is also preferably located at the motor mechanism side. The lubricating oil is also required at the motor mechanism side. If the step of the main bearing is located at the motor mechanism side, the step favorably holds the lubricating oil at the motor mechanism side, and the main bearing favorably generates relative rotation.

The movable scroll can have a movable base plate in which the boss portion is formed in a center, and a movable spiral wall that has a spiral shape and extends in a direction opposite to the boss portion from the movable base plate. A motor mechanism that drives the drive shaft can be provided in the housing. A main bearing that serves as the bearing according to the present invention can be provided in the space between the boss portion which is the outer bearing-receiving portion and the drive bush which is the inner bearing-receiving portion. The drive bush can have a chamfer in at least one of both ends in the axial direction. Movement restriction means that restricts the inner sliding member from moving to the chamfer is preferably provided between the outer sliding member and the movable scroll, or between the outer sliding member and the drive bush. When the bearing according to the present invention is not press-fitted between the boss portion and the drive bush, the main bearing can slightly move in the axial direction. Even when the main bearing slightly moves in the axial direction, local abrasion due to abutment of the inner sliding member onto the chamfer hardly occurs.

The movement restriction means can be the step which is formed at the movable base plate side. In this case, the inner circumferential surface of the inner sliding member can be prevented from abutting on the chamfer by the step at the movable base plate side, which holds the lubricating oil. Therefore, other additional members do not have to be adopted, and the configuration of the scroll compressor is simplified.

The movement restriction means is a convex portion that is formed at the movable scroll, and abuts on the outer sliding member to space the inner sliding member away from the movable base plate. In this case, irrespective of presence or absence of the step at the movable base plate side, the inner circumferential surface of the inner sliding member can be prevented from abutting on the chamfer.

The drive bush can be formed of a bush portion having a cylindrical outer circumferential surface, and a balance weight portion that is integrated with the bush portion, and extends in a sector shape. The movement restriction means can be the balance weight portion which abuts on the outer sliding member to space the inner sliding member away from the motor mechanism. In this case, irrespective of presence or absence of the step at the motor mechanism side, the inner circumferential surface of the inner sliding member can be prevented from abutting on the chamfer.

The step of the bearing can be formed of a first step that is located at one side in the axial direction, and a second step that is located at the other side in the axial direction. Lengths in the axial direction of the first step and the second step are preferably equal to each other. Since in this case, the bearing does not have an orientation, manufacture of the bearing is facilitated, and manufacture of the scroll compressor is also facilitated, whereby reduction in the manufacture cost can be realized more reliably. Note that when the present description indicates that the lengths in the axial direction of the first step and the second step are equal to each other, tolerance is included.

An auxiliary bearing that serves as the bearing according to the present invention can be provided in the space between the housing which is the outer bearing-receiving portion and the one end portion of the drive shaft which is the inner bearing-receiving portion. A shaft hole through which the drive shaft is inserted can be formed in the housing. A seal member and the auxiliary bearing can be provided in the shaft hole. Further, in the drive shaft, an oil supply hole can be formed to provide communication between a space formed by the seal member and the auxiliary bearing, and the other end portion of the drive shaft. The step of the auxiliary bearing preferably faces the oil supply hole. The oil supply hole in the drive shaft supplies the lubricating oil to the other end portion of the drive shaft from the space between the seal member and the auxiliary bearing, and assists lubrication of the bearing provided at the other end portion of the drive shaft. When the step of the auxiliary bearing faces the oil supply hole, the lubricating oil held by the step of the auxiliary bearing is easily supplied to the other end portion of the drive shaft by passing through the oil supply hole.

The outer sliding member can be a metallic collar that holds the inner sliding member. Further, the inner sliding member is formed from a resin excellent in sliding characteristics, and consists of an inner layer that an inner circumferential surface configures the inner boundary zone, a back metal that is fixed to the outer sliding member, and a middle layer that bonds the inner layer and the back metal. The inner sliding member is a component of a three-layer structure. In this case, the strength of the bearing according to the present invention can be made sufficient. The bearing can be obtained by fitting the back metal of the inner sliding member into the outer sliding member.

The inner layer preferably has a chamfer in at least one of both ends in the axial direction, and is made the inner boundary zone except for a portion to which the chamfer is applied. In this case, chipping hardly occurs to the inner layer, and the inner sliding member exhibits excellent durability.

The collar preferably has a chamfer in at least one of both ends in the axial direction, and is made the outer boundary zone except for a portion to which the chamfer is applied. In this case, chipping hardly occurs to the collar, and the slidability of the boundary zone is not impaired by the foreign matter generated by chipping.

The inner sliding member can be a metallic collar that holds the outer sliding member. Further, the outer sliding member is formed from a resin excellent in sliding characteristics, and consists of an inner layer that an inner circumferential surface configures the middle boundary zone, a back metal that is fixed to the outer bearing-receiving portion, and a middle layer that bonds the inner layer and the back metal. The outer sliding member is a component of a three-layer structure. In this case, strength of the bearing also can be made sufficient. The bearing can be obtained by fitting the outer sliding member onto the inner sliding member. The back metal of the outer sliding member can be press-fitted in the outer bearing-receiving portion.

The movable scroll can have a movable base plate in which the boss portion is formed in a center, and a movable spiral wall that has a spiral shape and extends in a direction opposite to the boss portion from the movable base plate. A main bearing that serves as the bearing according to the present invention can be provided in the space between the boss portion which is the outer bearing-receiving portion and the drive bush which is the inner bearing-receiving portion. In the movable base plate, a concave portion that faces the main bearing is preferably formed. There is the fear that when the bearing slightly moves in the axial direction, and the gap between the outer sliding member and the movable base plate becomes small, the lubricating oil is difficult to supply to the gap. If the concave portion is formed therein, the lubricating oil is held in the concave portion, and the main bearing favorably generates relative rotation.

A motor mechanism that drives the drive shaft is preferably provided in the housing. In this case, the motor mechanism in the housing is easily kept at a relatively low temperature by the present invention, and the motor mechanism easily exhibits performance.

Advantageous Effect of Invention

The scroll compressor of the present invention can realize reduction in manufacture cost, and can exhibit excellent durability even under severe use conditions where the scroll compressor is intermittently operated, varies in a rotational speed, and causes liquid compression.

BRIEF DESCRIPTION OF DRAWINGS

FIG. 6 relates to the scroll compressor of embodiment 1, and is a further enlarged sectional view of the essential part shown in FIG. 5.

FIG. 7 relates to the scroll compressor of embodiment 1, and is an enlarged sectional view showing a state in which the bearing has moved to one end side.

FIG. 8 relates to the scroll compressor of embodiment 1, and is an enlarged sectional view showing a state in which the bearing has moved to the other end side.

DESCRIPTION OF EMBODIMENTS

Hereinafter, embodiments 1 to 4 which embody the present invention will be described with reference to the drawings.
(Embodiment 1)

Figure 1:
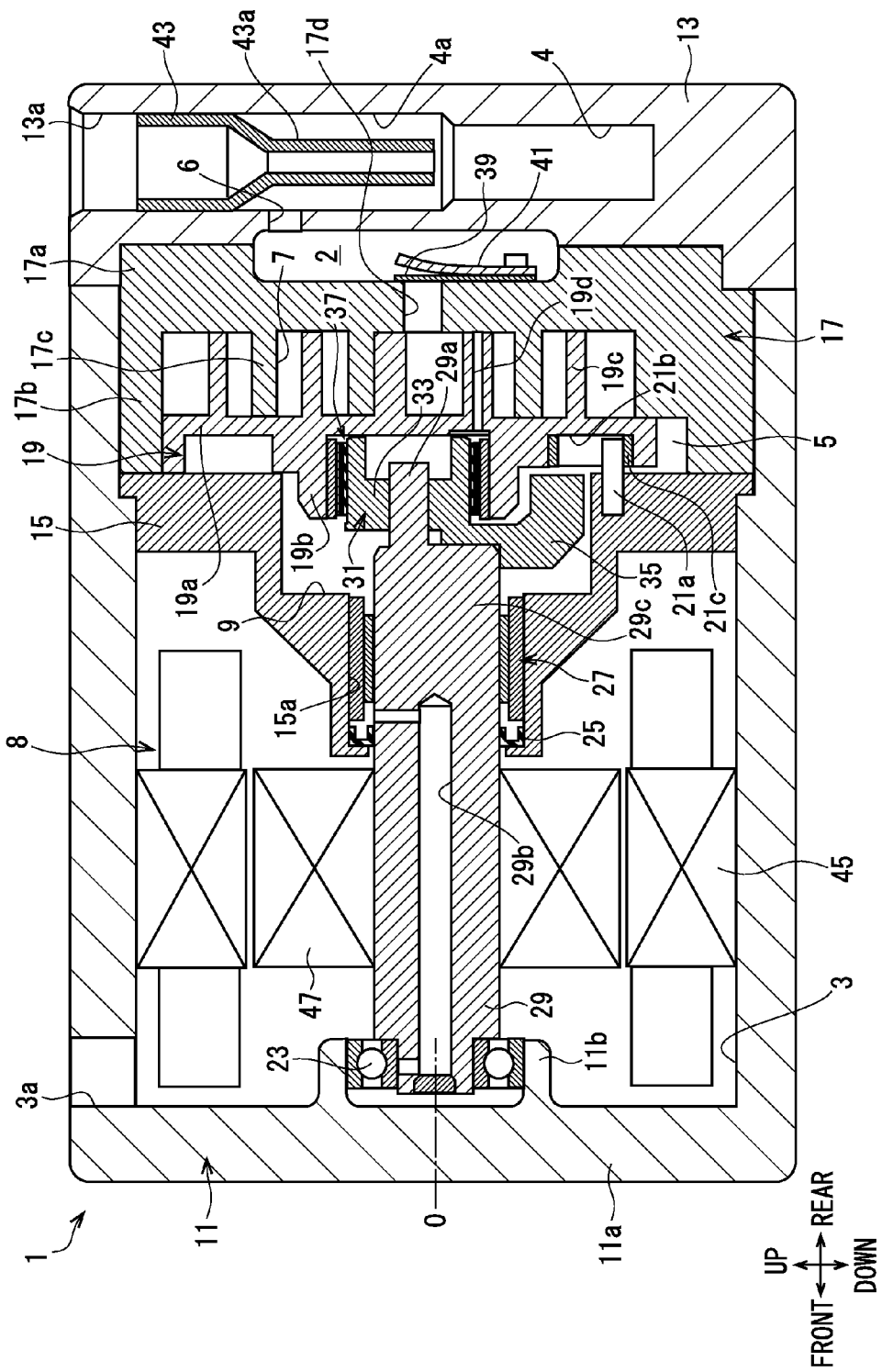
FIG. 1 is a sectional view of a scroll compressor of embodiment 1.

As shown in FIG. 1, a scroll compressor of embodiment 1 is a motor-driven compressor having a motor mechanism 8 integrally therewith. The scroll compressor has a housing 1. The housing 1 has a front housing 11 which is formed bottomed cylindrical with a rear end side opened, a rear housing 13 which is formed into a lid shape to close a rear end of the front housing 11, and a fixed block 15 which is supported in the front housing 11.

Insides of the front housing 11 and the rear housing 13 are partitioned into a motor chamber 3 located at a front and an operation chamber 5 located at a rear by the fixed block 15. The motor chamber 3 also serves as a suction chamber. In the operation chamber 5, a fixed scroll 17 is fixed by being sandwiched by the fixed block 15 and the rear housing 13, and a movable scroll 19 is provided between the fixed scroll 17 and the fixed block 15.

The fixed scroll 17 is formed of a fixed base plate 17a that is located at the rear housing 13 side, an outer circumferential wall 17b that extends forward in a cylindrical shape on an outer circumference of the fixed base plate 17a, and a fixed spiral wall 17c that extends forward in a spiral shape inside the outer circumferential wall 17b.

The movable scroll 19 is formed of a movable base plate 19a that is located at the fixed block 15 side, a boss portion 19b that extends forward in a cylindrical shape in a center of the movable base plate 19a, and a movable spiral wall 19c that extends rearward in a spiral shape from the movable base plate 19a. A compression chamber 7 is formed by being surrounded by the fixed scroll 17 and the movable scroll 19. Further, a space between the fixed block 15 and the movable base plate 19a is defined as a back pressure chamber 9. In the fixed block 15, a suction passage not illustrated that causes the motor chamber 3 and the compression chamber 7 at the outer circumferential side to communicate with each other is formed.

Figure 2:
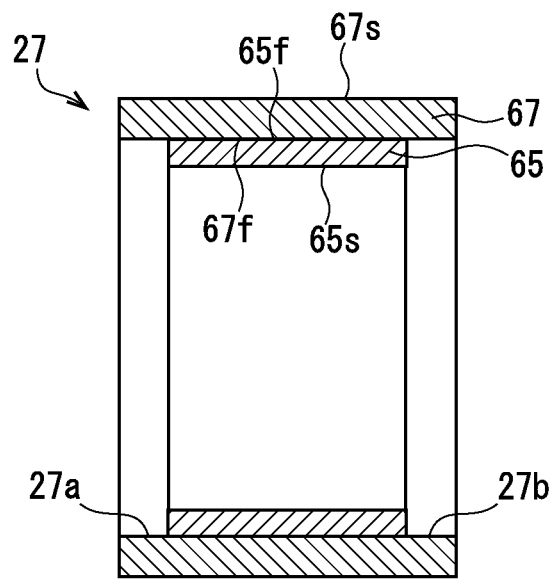
FIG. 2 relates to the scroll compressor of embodiment 1, and is an enlarged sectional view of a bearing which is provided in the space between one end portion at a drive bush side in a drive shaft and a housing.

A cylindrical shaft support portion 11b is protrudingly provided in a center on an inner surface of a front end wall 11a of the front housing 11. In a center of the fixed block 15, a shaft hole 15a is formed to penetrate the fixed block 15. A roller bearing 23 is press-fitted in the shaft support portion 11b. The shaft hole 15a is provided with a seal member 25, and a double-sided sliding bearing 27 which is a bearing and an auxiliary bearing according to the present invention, as shown in FIG. 2. As shown in FIG. 1, a drive shaft 29 is supported rotatably around a drive shaft axis O by the roller bearing 23, the seal member 25 and the double-sided sliding bearing 27. The fixed block 15 corresponds to an outer bearing-receiving portion, and one end portion 29c of the drive shaft 29 corresponds to an inner bearing-receiving portion.

Figure 4:
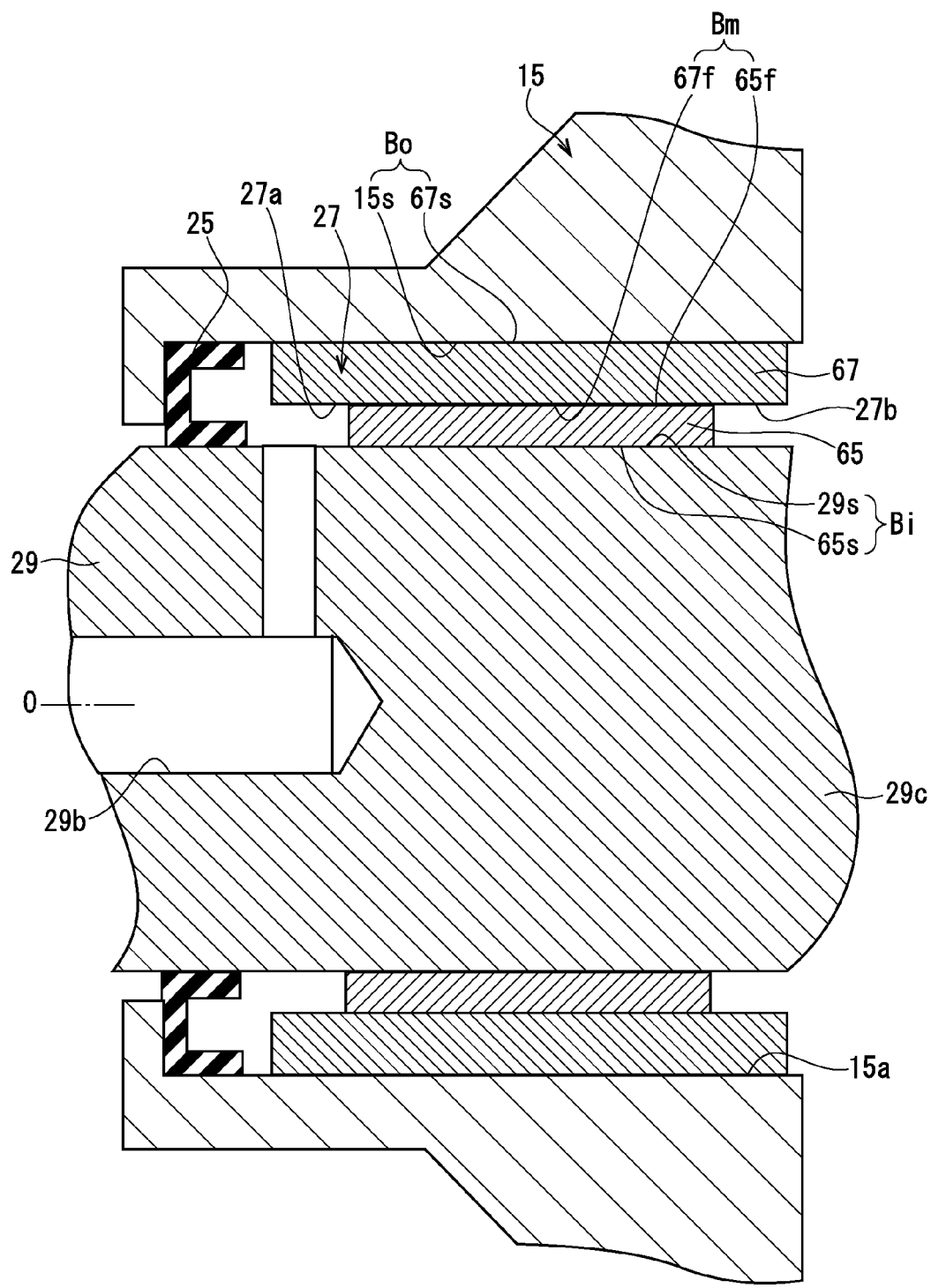
FIG. 4 relates to the scroll compressor of embodiment 1, and is an enlarged sectional view of an essential part.

As shown in FIG. 2, the double-sided sliding bearing 27 is obtained by press-fitting a cylindrical inner sliding member 65 into a cylindrical outer sliding member 67. As shown in FIG. 4, an inner circumferential surface 65s of the inner sliding member 65 and an outer circumferential surface 29s of the one end portion 29c of the drive shaft 29 form an inner boundary zone Bi. In the inner boundary zone Bi relative rotation is generated. An outer circumferential surface 67s of the outer sliding member 67 and an inner circumferential surface 15s of the fixed block 15 form an outer boundary zone Bo. In the outer boundary zone Bo relative rotation is generated. An inner circumferential surface 67f of the outer sliding member 67 and an outer circumferential surface 65f of the inner sliding member 65 form a middle boundary zone Bm. The middle boundary zone Bm is fixed by press-fitting.

The inner sliding member 65 is formed from a material of one layer of a tin-base alloy or the like. Further, the outer sliding member 67 is a metallic collar which holds the inner sliding member 65.

As shown in FIG. 2, the inner sliding member 65 is shorter in a length in an axial direction than the outer sliding member 67. Therefore, at a front end of the inner sliding member 65, a first step 27a is formed at the connection between the inner sliding member 65 and the outer sliding member 67. Further, at a rear end of the inner sliding member 65, a second step 27b is formed at the connection between the inner sliding member 65 and the outer sliding member 67. As shown in FIG. 4, in the double-sided sliding bearing 27, the inner sliding member 65 is press-fitted into a position where a front and a rear of the outer sliding member 67 are the same, that is, front and rear symmetric. That is to say, in the double-sided sliding bearing 27, lengths in the axial direction of the first step 27a and the second step 27b are equal to each other. A space into which a lubricating oil is introduced is partitioned by the seal member 25, the fixed block 15, the double-sided sliding bearing 27 and the one end portion 29c of the drive shaft 29.

As shown in FIG. 1, a plurality of rotation prevention pins 21a that extend toward the movable base plate 19a of the movable scroll 19 are fixed to a rear surface of the fixed block 15. Further, in a front surface of the movable base plate 19a, a rotation prevention hole 21b that receives a tip end portion of the rotation prevention pin 21a in a loose-fit state is provided by being recessed. A cylindrical ring 21c is loosely fitted into the rotation prevention hole 21b. When the drive shaft 29 rotates, the rotation prevention pin 21a slides and rolls on an inner circumferential surface of the ring 21c, whereby the movable scroll 19 is restricted from rotating and is only enabled to orbit around the drive shaft axis O.

At a rear end of the drive shaft 29, an eccentric shaft portion 29a is provided to protrude rearward at an eccentric position from the drive shaft axis O. The eccentric shaft portion 29a is formed into a columnar shape, or is formed into a substantially columnar shape with two flat surfaces having a width therebetween formed on an outer circumferential surface. A drive bush 31 is fitted onto the eccentric shaft portion 29a.

Figure 5:
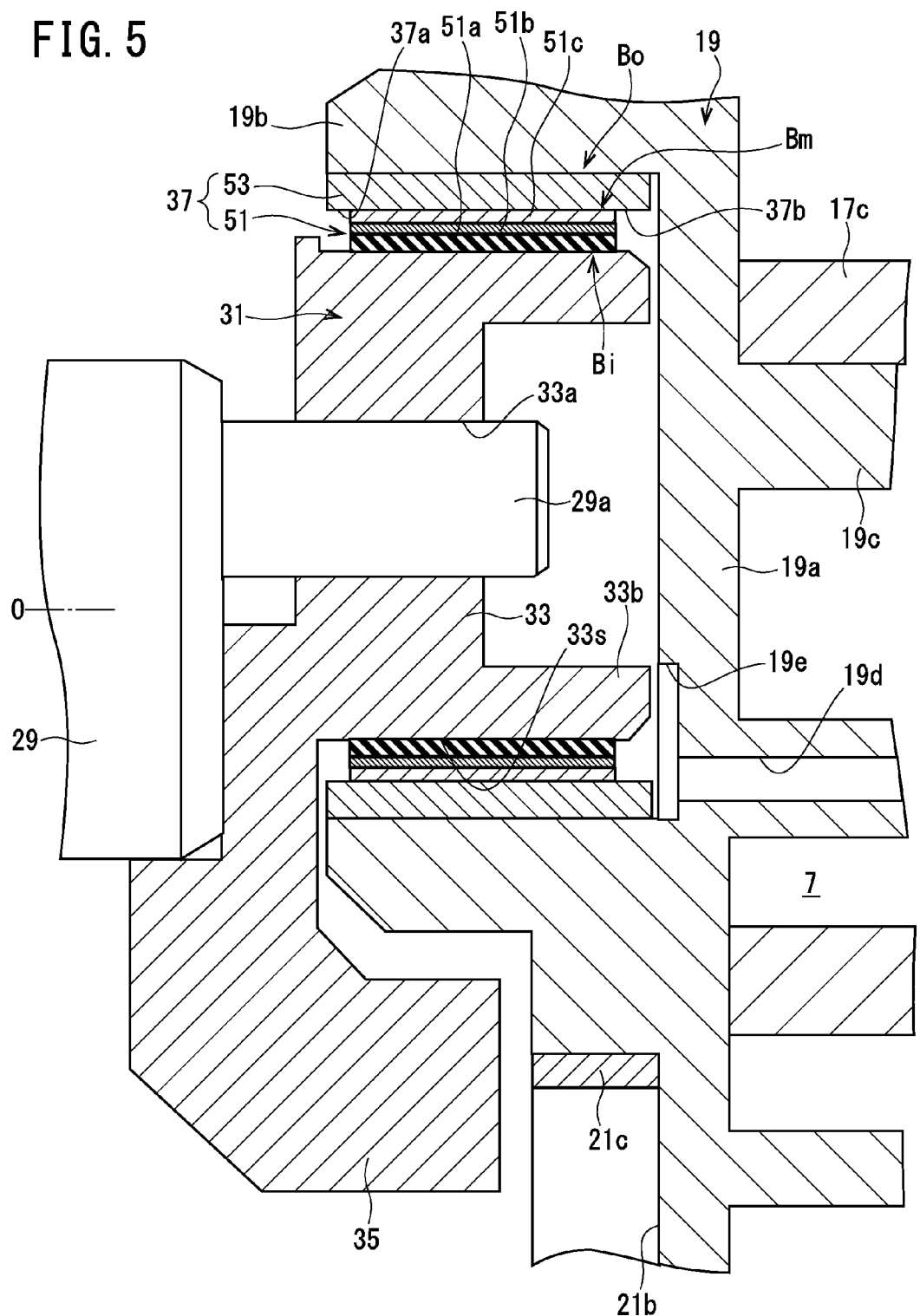
FIG. 5 relates to the scroll compressor of embodiment 1, and is an enlarged sectional view of another essential part.

The drive bush 31 is made of a carbon steel. As shown in FIG. 5, the drive bush 31 is formed of a bush portion 33 having a cylindrical outer circumferential surface 33s, and a balance weight portion 35 that is integrated with the bush portion 33, and extends in a sector shape while abutting on a rear end surface of the drive shaft 29. The bush portion 33 is fitted in the boss portion 19b of the movable scroll 19. Further, in the bush portion 33, an insertion hole 33a is provided to penetrate the bush portion 33, and the eccentric shaft portion 29a is fitted in the insertion hole 33a. A double-sided sliding bearing 37 as the bearing according to the present invention and a main bearing is provided in the space between the bush portion 33 and the boss portion 19b.

Figure 3:
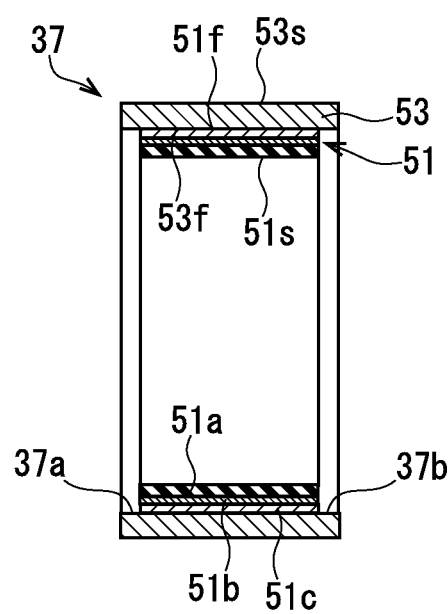
FIG. 3 relates to the scroll compressor of embodiment 1, and is an enlarged sectional view of a bearing which is provided in the space between a drive bush and a boss portion.

As shown in FIG. 3, the double-sided sliding bearing 37 is obtained by press-fitting a cylindrical inner sliding member 51 into a cylindrical outer sliding member 53. As shown in FIG. 6, an inner circumferential surface 51s of the inner sliding member 51 and an outer circumferential surface 33s of the bush portion 33 form an inner boundary zone Bi. In the inner boundary zone Bi relative rotation is generated. An outer circumferential surface 53s of the outer sliding member 53 and an inner circumferential surface 19s of the boss portion 19b form an outer boundary zone Bo. In the outer boundary zone Bo relative rotation is generated. An inner circumferential surface 53f of the outer sliding member 53 and an outer circumferential surface 51f of the inner sliding member 51 form a middle boundary zone Bm. The middle boundary zone Bm is fixed by press-fitting.

As shown in FIG. 3, the inner sliding member 51 is formed from a fluorine resin excellent in sliding characteristics, and has an inner layer 51a that configures the inner circumferential surface 51s, a back metal 51c that is press-fitted in the outer sliding member 53, and a middle layer 51b that bonds the inner layer 51a and the back metal 51c. As shown in FIG. 6, the inner layer 51a has chamfers 51d and 51e at both ends in the axial direction.

The outer sliding member 53 is a metallic collar that holds the inner sliding member 51. At an inner edge of the outer sliding member 53, chamfers 53a and 53b are formed at both ends in the axial direction. Further, at an outer edge of the outer sliding member 53, chamfers 53c and 53d are also formed at both ends in the axial direction.

The inner sliding member 51 is shorter in a length in the axial direction than the outer sliding member 53. Therefore, at a front end of the inner sliding member 51, a first step 37a is formed at the connection between the inner sliding member 51 and the outer sliding member 53. Further, at a rear end of the inner sliding member 51, a second step 37b is formed at the connection between the inner sliding member 51 and the outer sliding member 53. In the double-sided sliding bearing 37, the inner sliding member 51 is also press-fitted into a position where a front and a rear of the outer sliding member 53 are the same, that is, front and rear are symmetric. That is to say, in the double-sided sliding bearing 37, lengths in the axial direction of the first step 37a and the second step 37b are equal to each other. The first step 37a is located at the motor mechanism 8 side. The second step 37b is located in the vicinity of the movable base plate 19a.

The bush portion 33 of the drive bush 31 has a flange 33c at a front end in the axial direction. A curved surface 33r is formed between the flange 33c and the outer circumferential surface 33s of the bush portion 33. Further, in the bush portion 33, a chamfer 33b is formed at a rear end in the axial direction. In the movable scroll 19, a relief groove 19d is formed between the inner circumferential surface 19s of the boss portion 19b and a front surface of the movable base plate 19a. Note that in place of the relief groove 19d, a curved surface similar to the curved surface 33r of the flange 33c can be formed.

As shown in FIG. 1, a discharge chamber 2 is formed between the fixed scroll 17 and the rear housing 13, and in the fixed base plate 17a of the fixed scroll 17, a discharge port 17d that causes the compression chamber 7 and the discharge chamber 2 to communicate with each other is provided to penetrate the fixed base plate 17a. In the discharge chamber 2, a discharge reed valve 39 that opens and closes the discharge port 17d, and a retainer 41 that restricts an opening degree of the discharge reed valve 39 are provided.

Further, in the movable spiral wall 19c and the movable base plate 19a of the movable scroll 19, a supply hole 19d that extends linearly in the axial direction is provided to penetrate through the movable spiral wall 19c and the movable base plate 19a of the movable scroll 19. As shown in FIG. 5, at the boss portion 19b side of the supply hole 19d, a concave portion 19e with a diameter larger than that of the supply hole 19d is formed. The concave portion 19e faces a portion corresponding to thicknesses of the double-sided sliding bearing 37 and the cylindrical portion 33b of the bush portion 33. The supply hole 19d causes the compression chamber 7 near the discharge port 17d and an inside of the boss portion 19b to communicate with each other for an extremely short time period.

As shown in FIG. 1, in the drive shaft 29, an oil supply hole 29b that causes a space between the seal member 25 in the shaft hole 15a in the fixed block 15 and the double-sided sliding bearing 27, and the inner ring of the roller bearing 23 to communicate with each other is formed. The first step 27a of the double-sided sliding bearing 27 faces the oil supply hole 29b.

An oil separation chamber 4 that vertically extends is formed in the rear housing 13. To an upper part of the oil separation chamber 4, a separation cylinder 43 having an cylindrical outer circumferential surface 43a is fixed. An inner circumferential surface 4a of the oil separation chamber 4 that faces the outer circumferential surface 43a is coaxial with the outer circumferential surface 43a, and a centrifugal separation type separator is configured by them. The discharge chamber 2 is caused to communicate with a space between the inner circumferential surface 4a and the outer circumferential surface 43a by a discharge passage 6.

In the motor chamber 3, a stator 45 is provided by being fixed to an inner circumferential surface of the front housing 11. Inside the stator 45, a rotor 47 which is fixed to the drive shaft 29 is provided. The motor mechanism 8 is configured by the rotor 47, the stator 45 and the drive shaft 29. In a front end side of the front housing 11, an inlet port 3a that causes an outside and the motor chamber 3 to communicate with each other is provided to penetrate the front end side of the front housing 11. In the rear housing 13, an outlet port 13a that causes an inside of the separation cylinder 43 and the outside to communicate with each other is provided to penetrate the rear housing 13.

The inlet port 3a is connected to an evaporator by piping. The evaporator is connected to an expansion valve by piping. The expansion valve is connected to a condenser by piping. The condenser is connected to the outlet port 13a by piping. Illustration of the respective pipings, the evaporator, the expansion valve and the condenser is omitted. The scroll compressor, the respective pipings, the evaporator, the expansion valve and the condenser configure a refrigeration circuit of an air-conditioning apparatus for a vehicle.

In the scroll compressor, the double-sided sliding bearing 37 is adopted in the space between the drive bush 31 and the boss portion 19b, and the double-sided sliding bearing 27 is also adopted in the space between the one end portion 29c at the drive bush 31 side in the drive shaft 29, and the fixed block 15. Therefore, the scroll compressor can reduce manufacture cost.

The scroll compressor operates as follows. That is, when the driver of the vehicle performs an operation to the air-conditioning apparatus for the vehicle, a motor control circuit not illustrated controls the motor mechanism 8 based on the operation, and rotates the rotor 47 and the drive shaft 29 around the drive shaft axis O. Thereby, the eccentric shaft portion 29a turns around the drive shaft axis O, and the movable scroll 19 orbits around the drive shaft axis O. Therefore, the compression chamber 7 moves to a center side from the outer circumferential side while reducing in the capacity, and therefore, the refrigerant gas which is supplied to the motor chamber 3 from the evaporator via the inlet port 3a is sucked into the compression chamber 7 and is compressed inside the compression chamber 7. The refrigerant gas compressed to a discharge pressure is discharged to the discharge chamber 2 from the compression chamber 7 through the discharge port 17d. The refrigerant gas in the discharge chamber 2 is supplied to the separator through the discharge passage 6, and the lubricating oil is stored in the oil separation chamber 4. The lubricating oil in the oil separation chamber 4 is provided for various kinds of lubrication. The refrigerant gas from which the lubricating oil is separated is discharged to the condenser from the outlet port 13a. In this manner, air-conditioning of the air-conditioning apparatus for a vehicle is performed.

During the above, in the scroll compressor, in the two boundary zones that are the outer boundary zone Bo and the inner boundary zone Bi of the double-sided sliding bearing 27, relative rotation is generated, as shown in FIG. 4. Therefore, even when the scroll compressor is used under severe conditions, in the outer boundary zone Bo and the inner boundary zone Bi relative rotation is generated by a load thereof. At this time, the inner boundary zone Bi slides with a lower friction coefficient than in the outer boundary zone Bo relative rotation is generated. Therefore, the load also can be released.

Further, as shown in FIG. 5, in the scroll compressor, in the two boundary zones that are the outer boundary zone Bo and the inner boundary zone Bi of the double-sided sliding bearing 37, relative rotation is generated. Therefore, even when an excessively large load temporarily acts on the double-sided sliding bearing 37 from the eccentric shaft portion 29a, in the outer boundary zone Bo and the inner boundary zone Bi relative rotation is generated by a load thereof. At this time, the inner boundary zone Bi slides with a lower friction coefficient than in the outer boundary zone Bo relative rotation is generatedTherefore, the load can be released.

Especially in a scroll compressor for a vehicle, an excessively large load easily acts, because the scroll compressor for a vehicle is intermittently operated, is varied in the rotational speed, and causes liquid compression, due to change in an outside air temperature and operation conditions, turning-on-and-off of the switch, and the like, whereas in the present scroll compressor, loads that act on the double-sided sliding bearings 27 and 37 can be released, and therefore, local abrasion hardly occurs to the double-sided sliding bearings 27 and 37.

Further, as shown in FIG. 4, in the present scroll compressor, the outer sliding member 67 and the inner sliding member 65 of the double-sided sliding bearing 27 form the first and the second steps 27a and 27b at both the ends in the axial direction, and the lubricating oil can be easily held in the first and the second steps 27a and 27b by a capillary phenomenon. Therefore, the lubricating oil is easily supplied to the outer boundary zone Bo and the inner boundary zone Bi of the double-sided sliding bearing 27, and relative rotation is generated more easily in the outer boundary zone Bo and the inner boundary zone Bi.

Further, as shown in FIG. 5, in the scroll compressor, the outer sliding member 53 and the inner sliding member 51 of the double-sided sliding bearing 37 form the first and the second steps 37a and 37b at both the ends in the axial direction, and the lubricating oil is easily held in the first and the second steps 37a and 37b by a capillary phenomenon, and relative rotation is generated more easily in the outer boundary zone Bo and the inner boundary zone Bi.

Furthermore, as shown in FIG. 6, since in the scroll compressor, the second step 37b of the double-sided sliding bearing 37 is located in the vicinity of the movable base plate 19a, the second step 37b favorably holds the lubricating oil at a side of a deep inside of the boss portion 19b, and the double-sided sliding bearing 37 favorably generates relative rotation.

Further, since in the scroll compressor, the first step 37a of the double-sided sliding bearing 37 is located at the motor mechanism 8 side, the first step 37a favorably holds the lubricating oil at the motor mechanism 8 side, and the double-sided sliding bearing 37 favorably generates relative rotation.

In the scroll compressor, the double-sided sliding bearing 37 is not press-fitted between the boss portion 19b and the bush portion 33, and therefore, the double-sided sliding bearing 37 can move slightly in the axial direction. For example, as shown in FIG. 7, when the double-sided sliding bearing 37 moves to the rear side, a rear end surface of the outer sliding member 53 abuts on the front surface of the movable base plate 19a. Therefore, by the second step 37b, which holds the lubricating oil, at the movable base plate 19a side, the inner circumferential surface 51s in the inner layer 51a of the inner sliding member 51 can be prevented from abutting on the chamfer 33b. The second step 37b corresponds to movement restriction means. Further, at this time, the chamfer 53d of the outer sliding member 53 faces the relief groove 19d, and therefore, can prevent the outer circumferential surface 53s from abutting on the relief groove 19d.

Figure 9:
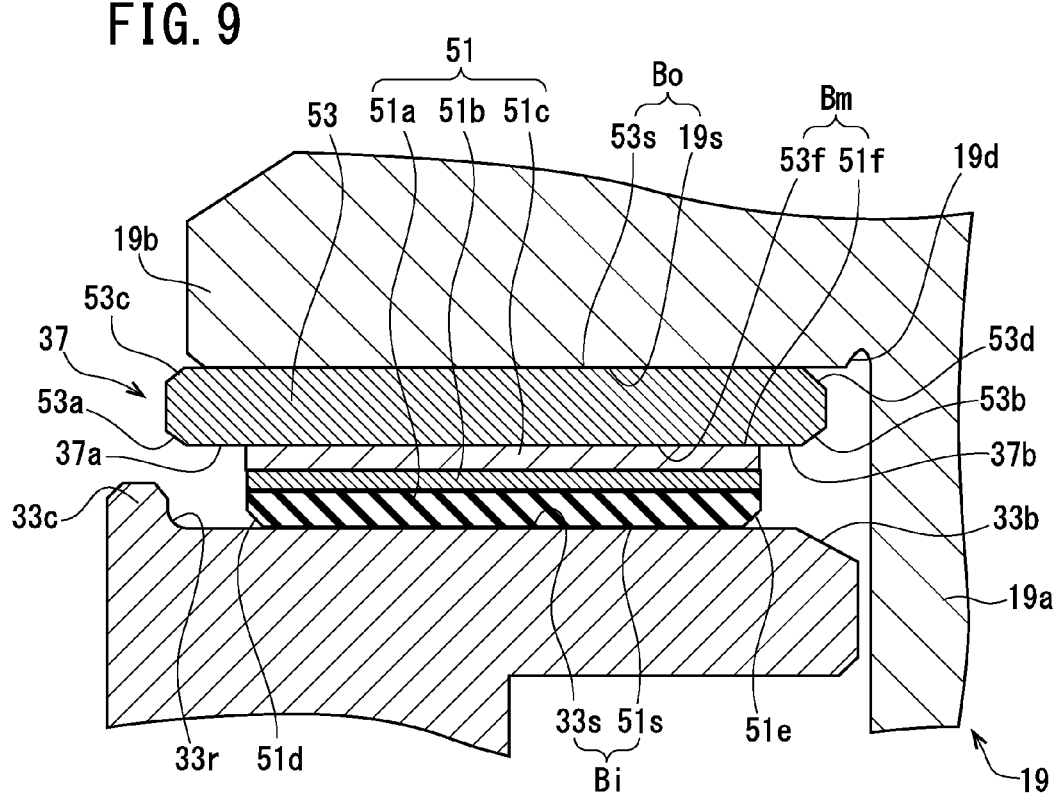
FIG. 9 relates to the scroll compressor of embodiment 1, and is an enlarged sectional view showing a state in which the bearing has moved to the other end side.

As shown in FIG. 8, when the double-sided sliding bearing 37 moves to the front side, a front end surface of the outer sliding member 53 abuts on a rear surface of the balance weight portion 35. Therefore, as shown in FIG. 9, in the double-sided sliding bearing 37, the inner circumferential surface 51s in the inner layer 51a of the inner sliding member 51 can be prevented from abutting on the curved surface 33r by the first step 37a, which holds the lubricating oil, at the balance weight portion 35 side.

Further, the double-sided sliding bearing 37 has the chamfers 51d and 51e at both the ends of the inner layer 51a, and the inner boundary zone Bi is made except for the chamfers 51d and 51e. Therefore, local abrasion and chipping hardly occur to the inner layer 51a, and the inner sliding member 51 exhibits excellent durability. Further, the double-sided sliding bearing 37 has the chamfers 53c and 53d on the outer edge at both the ends, and the outer boundary zone Bo is made except for the chamfers 53c and 53d. Therefore, chipping hardly occurs to the outer sliding member 53, either, and the slidability of the outer boundary zone Bo is not impaired by a foreign matter generated by chipping.

Further, as shown in FIG. 2 and FIG. 3, in the scroll compressor, the double-sided sliding bearings 27 and 37 are substantially symmetrical with the centers in the axial direction as the references, and have no frontal and rear orientations. Therefore, manufacture of the double-sided sliding bearings 27 and 37 is easy. Further, as shown in FIG. 1, in process steps of inserting the double-sided sliding bearing 27 into the shaft hole 15a, and inserting the double-sided sliding bearing 37 into the boss portion 19b, the fronts and the rears of the double-sided sliding bearings 27 and 37 do not have to be distinguished, manufacture of the scroll compressor is facilitated, and reduction in the manufacture cost can be realized more reliably.

Further, in the scroll compressor, during an operation, the high-pressure refrigerant gas is supplied from the compression chamber 7 into the boss portion 19b through the supply hole 19d and the concave portion 19e. As shown in FIG. 5, the refrigerant gas passes through the second step 37b of the double-sided sliding bearing 37, the inner boundary zone Bi, the outer boundary zone Bo and the first step 37a, and passes between the eccentric shaft portion 29a and the insertion hole 33a to reach the back pressure chamber 9.

Since the concave portion 19e which faces the double-sided sliding bearing 37 and the cylindrical portion 33b of the bush portion 33 is formed in the movable base plate 19a, the lubricating oil is held in the concave portion 19e. Therefore, even when the double-sided sliding bearing 37 moves in the axial direction, and a gap between the outer sliding member 53 and the movable base plate 19a becomes small, the double-sided sliding bearing 37 favorably generates relative rotation.

Therefore, the inner boundary zone Bi, the outer boundary zone Bo and a space between the eccentric shaft portion 29a and the insertion hole 33a are lubricated by the lubricating oil contained by the refrigerant gas. Further, the pressure of the back pressure chamber 9 becomes high, and the movable scroll 19 is favorably urged to the fixed scroll 17. Further, the rotation prevention pin 21a and the like are favorably lubricated.

Further, as shown in FIG. 4, the refrigerant gas which reaches the back pressure chamber 9 passes through the inner boundary zone Bi and the outer boundary zone Bo of the double-sided sliding bearing 27, and reaches a space between the seal member 25 and the double-sided sliding bearing 27. Therefore, the seal member 25 favorably presses the drive shaft 29, and prevents the refrigerant gas from leaking into the motor chamber 3.

In particular, as for the oil supply hole 29b of the drive shaft 29, the lubricating oil is supplied from the space between the seal member 25 and the double-sided sliding bearing 27 to the inner ring of the roller bearing 23 through the oil supply hole 29b, as shown in FIG. 1. At this time, the lubricating oil which is held by the first step 27a is easily supplied to the roller bearing 23 through the oil supply hole 29b, because the first step 27a of the double-sided sliding bearing 27 faces the oil supply hole 29b. The lubricating oil which is supplied to the inner ring of the roller bearing 23 passes through the gap between the inner ring and the drive shaft 29 and moves to a front end of the drive shaft 29, and passes among balls of the roller bearing 23 to reach the motor chamber 3. Therefore, the roller bearing 23 is also favorably lubricated.

Therefore, in the scroll compressor, the motor mechanism 8 in the motor chamber 3 also can be kept at a relatively low temperature, and the motor mechanism 8 easily exhibits performance.

Further, as shown in FIG. 5, in the scroll compressor, the outer sliding member 53 of the double-sided sliding bearing 37 is the collar which holds the inner sliding member 51, the inner sliding member 51 is formed of the inner layer 51a, the middle layer 51b and the back metal 51c, and therefore, sufficient strength can be exhibited.

Accordingly, in the scroll compressor, reduction in manufacture cost can be realized, and excellent durability can be exhibited even under severe use conditions.

(Embodiment 2)

Figure 10:
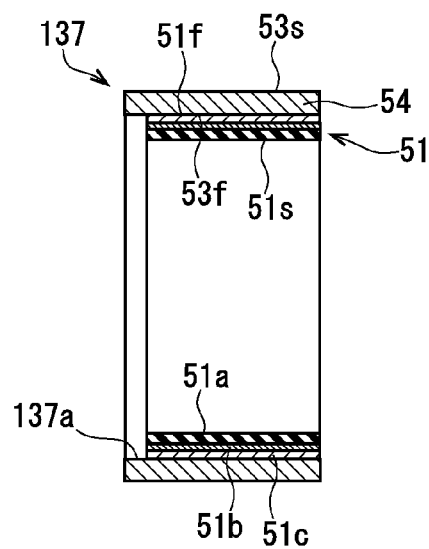
FIG. 10 relates to a scroll compressor of embodiment 2, and is an enlarged sectional view of a bearing which is provided in the space between a drive bush and a boss part.
Figure 11:
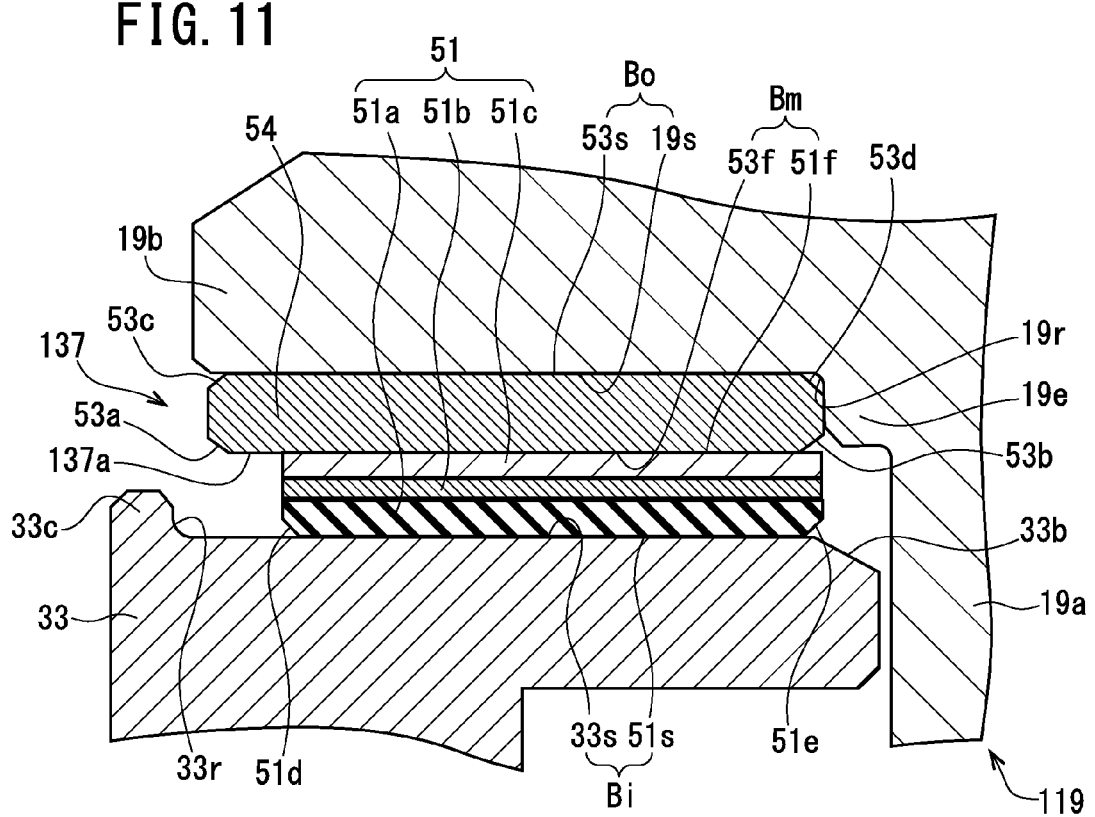
FIG. 11 relates to the scroll compressor of embodiment 2, and is an enlarged sectional view showing a state in which the bearing has moved to one end side.

As shown in FIG. 10, a scroll compressor of embodiment 2 adopts a double-sided sliding bearing 137 in place of the double-sided sliding bearing 37 of embodiment 1, and adopts a movable scroll 119 shown in FIG. 11.

As shown in FIG. 10, the double-sided sliding bearing 137 adopts the outer sliding member 54 which is shorter in the axial direction than the outer sliding member 53 of the double-sided sliding bearing 37 of embodiment 1. In the double-sided sliding bearing 137, the inner sliding member 51 is press-fitted into a position where a front and a rear of the outer sliding member 54 are different, that is, front and rear are asymmetric. Therefore, only at the front end of the inner sliding member 51, a step 137a is formed at the connection between the inner sliding member 51 and the outer sliding member 54. The step 137a is located at the motor mechanism 8 side.

Further, as shown in FIG. 11, in the movable scroll 119, a convex portion 19e is formed between the inner circumferential surface 19s of the boss portion 19b and the front surface of the movable base plate 19a. A curved surface 19r is formed between the convex portion 19e and the inner circumferential surface 19s. Since the other components are the same as those in embodiment 1, the same components as those in embodiment 1 are assigned with the same reference signs as in embodiment 1, and the detailed explanation will be omitted.

In the scroll compressor, when the double-sided sliding bearing 137 moves to the rear side, a rear end surface of the outer sliding member 54 abuts on a front surface of the convex portion 19e of the movable scroll 119. Therefore, the inner circumferential surface 51s in the inner layer 51a of the inner sliding member 51 can be prevented from abutting on the chamfer 33b. The convex portion 19e corresponds to movement restriction means. Further, at this time, the chamfer 53d of the outer sliding member 54 faces the curved surface 19r, and therefore, the outer circumferential surface 53s can be prevented from abutting on the curved surface 19r.

However, the scroll compressor also has a disadvantage of requiring attention at the time of assembly of the scroll compressor, because the inner sliding member 51 is press-fitted into the position near to the rear side of the outer sliding member 54. If assembly is performed with the front and the rear made different, there arises the fear that a part of the inner circumferential surface 51s of the inner layer 51a of the inner sliding member 51 interferes with the curved surface 33r of the bush portion 33, and the inner sliding member 51 is slightly worn locally. The other operational effects are similar to those in embodiment 1.

(Embodiment 3)

Figure 12:
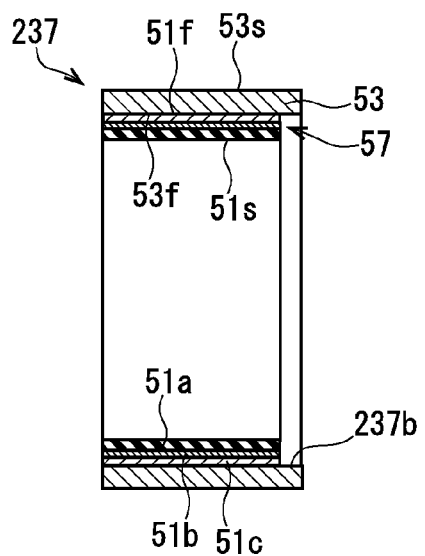
FIG. 12 relates to a scroll compressor of embodiment 3, and is an enlarged sectional view of a bearing which is provided in the space between a drive bush and a boss portion.

As shown in FIG. 12, the double-sided sliding bearing 237 adopts an inner sliding member 57 which is longer in the axial direction than the inner sliding member 51 of the double-sided sliding bearing 37 of embodiment 1. In the double-sided sliding bearing 237, the inner sliding member 57 is press-fitted into a position where a front and a rear of the outer sliding member 53 are different, that is, front and rear are asymmetric. Therefore, only at a rear end of the inner sliding member 57, a step 237b at the connection between the inner sliding member 57 and the outer sliding member 53.

Figure 13:
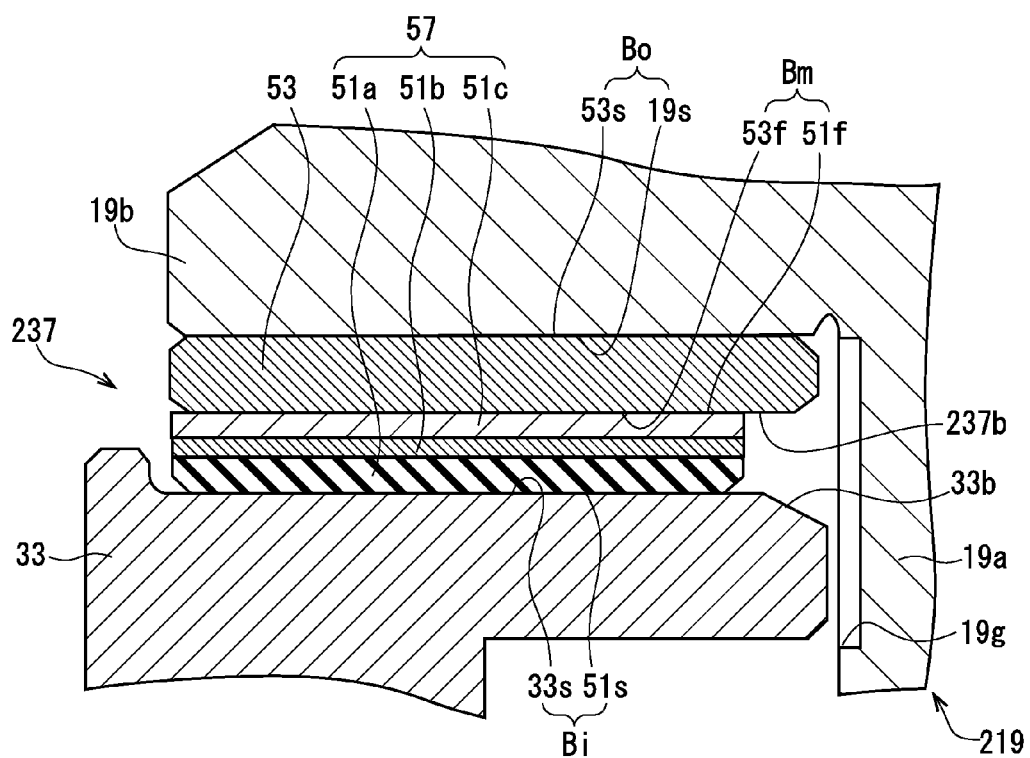
FIG. 13 relates to the scroll compressor of embodiment 3, and is an enlarged sectional view similar to FIG. 6.

Further, as shown in FIG. 13, in the movable scroll 219, a concave portion 19g is formed in the movable base plate 19a, in a different position from the supply hole 19d. Since the other components are the same as those in embodiment 1, the same components as those in embodiment 1 are assigned with the same reference signs as in embodiment 1, and the detailed explanation will be omitted.

In the scroll compressor, a lubricating oil held by the concave portion 19g is supplied to the inner boundary zone Bi and the outer boundary zone Bo, and relative rotation is generated favorably in the inner boundary zone Bi and the outer boundary zone Bo.

However, the scroll compressor also has a disadvantage of requiring attention at the time of assembly of the scroll compressor, because the inner sliding member 57 is press-fitted into the position near to the front side of the outer sliding member 53. If assembly is performed with the front and the rear made to be different, a part of the inner circumferential surface 51s of the inner layer 51a of the inner sliding member 57 abuts on the chamfer 33b, and the inner sliding member 57 is easily worn slightly locally. The other operational effects are similar to those in embodiment 1.

(Embodiment 4)

Figure 14:
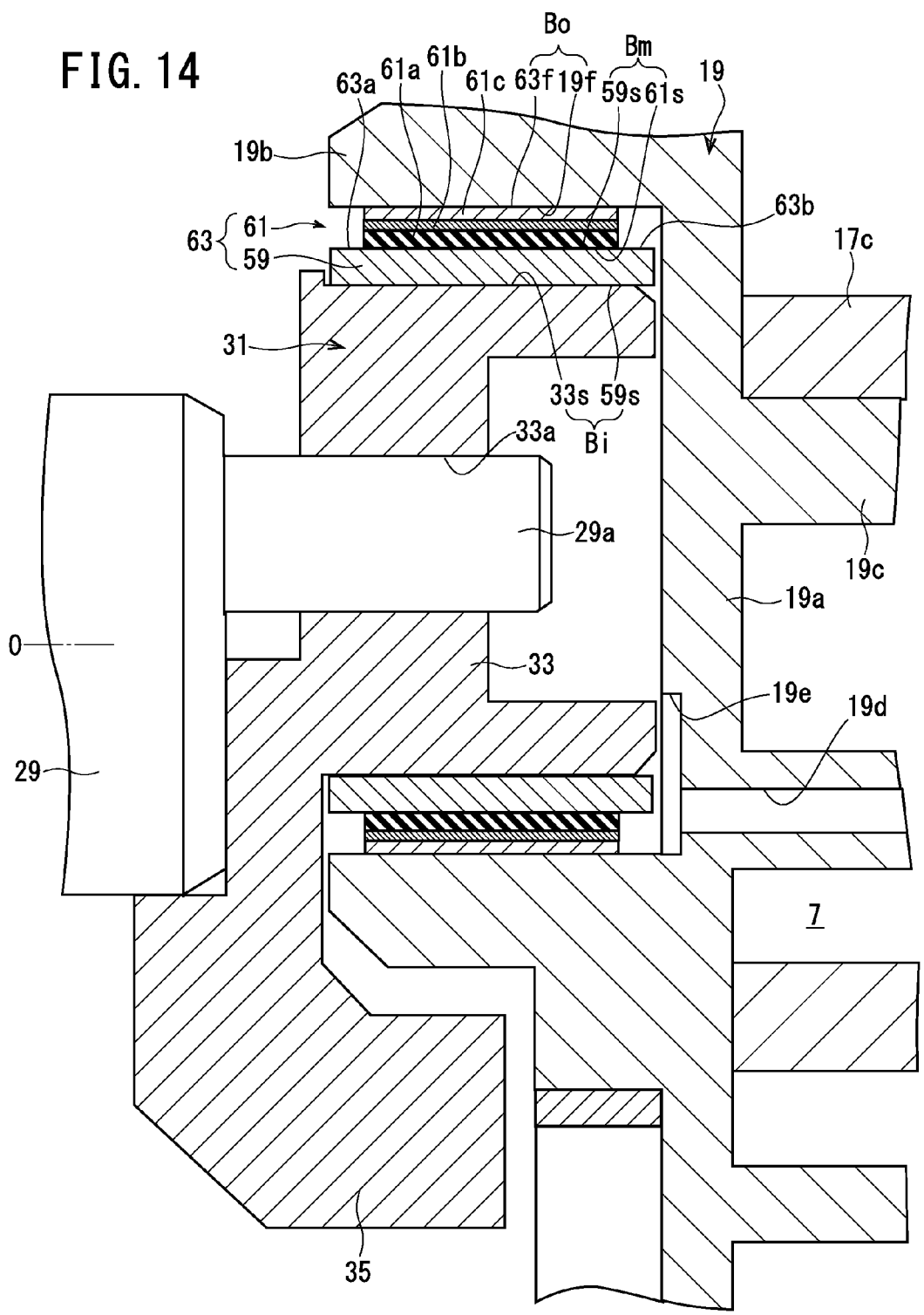
FIG. 14 relates to a scroll compressor of embodiment 4, and is an enlarged sectional view of an essential part.

As shown in FIG. 14, a scroll compressor of embodiment 4 adopts a double-sided sliding bearing 63 in place of the double-sided sliding bearing 37 of embodiment 1. The double-sided sliding bearing 63 is obtained by fitting an outer sliding member 61 onto an inner sliding member 59.

An inner circumferential surface 59s of the inner sliding member 59 and the outer circumferential surface 33s of the bush portion 33 form the inner boundary zone Bi. In the inner boundary zone Bi relative rotation is generated. An outer circumferential surface 63f of the outer sliding member 61 and an inner circumferential surface 19f of the boss portion 19b form the outer boundary zone Bo. The outer boundary zone Bo is fixed by press-fitting. An inner circumferential surface 61s of the outer sliding member 61 and the outer circumferential surface 59s of the inner sliding member 59 form the middle boundary zone Bm. In the middle boundary zone Bm relative rotation is generated.

The inner sliding member 59 is a metallic collar that holds the outer sliding member 61. Further, the outer sliding member 61 is formed from a fluorine resin excellent in sliding characteristics, and has an inner layer 61a that configures the inner circumferential surface 61s, a back metal 61c that is press-fitted in the boss portion 19b, and a middle layer 61b that bonds the inner layer 61a and the back metal 61c.

The outer sliding member 61 is shorter in a length in an axial direction than the inner sliding member 59. Therefore, at both ends of the outer sliding member 61, a first and a second steps 63a and 63b are formed at the connection between the outer sliding member 61 and the inner sliding member 59. The first step 63a is located at the motor mechanism 8 side. The second step 63b is located in the vicinity of the movable base plate 19a.

In the double-sided sliding bearing 63, the outer sliding member 61 is fitted onto the position where a front and a rear of the inner sliding member 59 are the same so that the front and the rear do not have to be distinguished in a process step of press-fitting the double-sided sliding bearing 63 into the boss portion 19b. Since the other components are the same as those in embodiment 1, the same components as those in embodiment 1 are assigned with the same reference signs as in embodiment 1, and the detailed explanation will be omitted.

In the scroll compressor, the middle boundary zone Bm slides with a lower friction coefficient than in the inner boundary zone Bi relative rotation is generated. Further, in the scroll compressor, the bush portion 33 of the drive bush 31 has the chamfer 33b, but the inner sliding member 59 of the double-sided sliding bearing 63 is formed of a metallic collar, and therefore, occurrence of abrasion to the inner circumferential surface 59s of the inner sliding member 59 does not substantially become a problem. The other operational effects are similar to those in embodiment 1.

While in the above, the present invention is described in conformity with embodiments 1 to 4, the present invention is not limited to embodiments 1 to 3 described above, and it goes without saying that the present invention can be applied by being appropriately modified within the range without departing from the gist of the present invention.

For example, the double-sided sliding bearing 37, 137, 237 or 63 is provided only in between the drive bush 31 and the boss portion 19b, and a sliding bearing having a sliding surface on one side surface can be provided between the one end portion 29c and the fixed block 15. In the sliding bearing, an outer circumferential surface is press-fitted into the shaft hole 15a of the fixed block 15, and an inner circumferential surface is clearance-fitted onto the one end portion 29c. In this case, the manufacture cost of the scroll compressor can be reduced more.

Further, a sliding bearing having a sliding surface on one side surface also can be provided in the shaft support portion 11b. In the sliding bearing, an outer circumferential surface is press-fitted into the shaft support portion 11b, and an inner circumferential surface is clearance-fitted onto the drive shaft 29. In this case, the manufacture cost of the scroll compressor also can be reduced more.

Further, while in embodiment 4, the double-sided sliding bearing 63 in which the back metal 61c, the middle layer 61b, the inner layer 61a and the inner sliding member 59 are located from the outer circumferential side to the inner circumferential side is adopted, a double-sided sliding bearing in which an inner layer, a middle layer, a back metal, an inner sliding member are located from the outer circumferential side to the inner circumferential side also can be adopted.

INDUSTRIAL APPLICABILITY

The present invention is applicable to an air-conditioning apparatus for a vehicle and the like.

REFERENCE SIGNS LIST

1 Housing
11 Front housing
13 Rear housing
15 Fixed block
17 Fixed scroll
7 Compression chamber
19, 119, 219 Movable scroll
19b Boss portion
O Drive shaft axis
29 Drive shaft
29a Eccentric shaft portion
31 Drive bush
29c One end portion
27, 37, 137, 237, 63 Double-sided sliding bearing (37, 137, 237, 63 Main bearing, 27 Auxiliary bearing)
Bi Inner boundary zone
Bm Middle boundary zone
Bo Outer boundary zone
65, 51, 57, 59 Inner sliding member
67, 53, 54, 61 Outer sliding member
27a, 27b, 37a, 37b, 137a, 237b, 63a, 63b Step (27a, 37a, 63a First step, 27b, 37b, 63b Second step)
19a Movable base plate
19c Movable spiral wall
15a Shaft hole
25 Seal member
29b Oil supply hole
51a, 61a Inner layer
51c, 61c Back metal
51b, 61b Middle layer
19e, 19g Concave portion
8 Motor mechanism

The invention claimed is:

1. A scroll compressor comprising a housing, a fixed scroll that is fixed to the housing, a movable scroll that forms a compression chamber between the movable scroll and the fixed scroll, a boss portion that is formed at the movable scroll, a drive shaft axially supported by the housing rotatably around a drive shaft axis, an eccentric shaft portion that is eccentric from the drive shaft axis and is rotatable integrally with the drive shaft, and a drive bush that is fitted onto the eccentric shaft portion and is fitted into the boss portion, and causes the movable scroll to orbit with respect to the fixed scroll,
- wherein a motor mechanism that drives the drive shaft is provided in the housing,
- the movable scroll has a movable base plate in which the boss portion is formed in a center, and a movable spiral wall that has a spiral shape and extends in a direction opposite to the boss portion from the movable base plate,
- a bearing is provided in at least one of a space between the drive bush and the boss portion, and a space between one end portion at the drive bush side in the drive shaft and the housing,
- the bearing has a cylindrical outer sliding member that is provided at a side of an outer bearing-receiving portion that serves as the boss portion or the housing, and a cylindrical inner sliding member that is provided at a side of an inner bearing-receiving portion that serves as the drive bush or the one end portion of the drive shaft,
- an outer boundary zone is defined by an inner circumferential surface of the outer bearing-receiving portion and an outer circumferential surface of the outer sliding member,
- a middle boundary zone is defined by an inner circumferential surface of the outer sliding member and an outer circumferential surface of the inner sliding member,
- an inner boundary zone is defined by an inner circumferential surface of the inner sliding member and an outer circumferential surface of the inner bearing-receiving portion,
- wherein at least two boundary zones of the outer boundary zone, middle boundary zone, and inner boundary zone, relative rotation is generated, and
- the outer sliding member and the inner sliding member have different lengths in an axial direction, and thereby form a step in at least one end in the axial direction,
- a main bearing that serves as the bearing is provided in the space between the boss portion which is the outer bearing-receiving portion and the drive bush which is the inner bearing-receiving portion,
- the drive bush has a chamfer in at least one of both ends in the axial direction, and
- movement restriction means that restricts the inner sliding member from moving to the chamfer is provided between the outer sliding member and the movable scroll, or between the outer sliding member and the drive bush.

2. The scroll compressor according to claim 1, wherein the step of the main bearing is located in a vicinity of the movable base plate.

3. The scroll compressor according to claim 1, wherein the step of the main bearing is located at the motor mechanism side.

4. The scroll compressor according to claim 1, wherein the movement restriction means is the step which is formed at the movable base plate side.

5. The scroll compressor according to claim 1, wherein the movement restriction means is a convex portion that is formed at the movable scroll, and abuts on the outer sliding member to space the inner sliding member away from the movable base plate.

6. The scroll compressor according to claim 1, wherein the drive bush is formed of a bush portion having a cylindrical outer circumferential surface, and a balance weight portion that is integrated with the bush portion, and extends in a sector shape, and
the movement restriction means is the balance weight portion which abuts on the outer sliding member to space the inner sliding member away from the motor mechanism.

7. The scroll compressor according to claim 1, wherein the step of the bearing is formed of a first step that is located at one side in the axial direction, and a second step that is located at the other side in the axial direction, and
lengths in the axial direction of the first step and the second step are equal to each other.

8. The scroll compressor according to claim 1, wherein an auxiliary bearing that serves as the bearing is provided in the space between the housing which is the outer bearing-receiving portion and the one end portion of the drive shaft, which is the inner bearing-receiving portion,
a shaft hole through which the drive shaft is inserted is formed in the housing,
a seal member and the auxiliary bearing are provided in the shaft hole,
in the drive shaft, an oil supply hole which provides communication between a space of the seal member and the auxiliary bearing, and the other end portion of the drive shaft is formed, and
the step of the auxiliary bearing faces the oil supply hole.

9. The scroll compressor according to claim 1, wherein the inner sliding member is a metallic collar that holds the outer sliding member, and
the outer sliding member is formed from a resin excellent in sliding characteristics, and has an inner layer that an inner circumferential surface configures the middle boundary zone, a back metal that is fixed to the outer bearing-receiving portion, and a middle layer that bonds the inner layer and the back metal.

10. The scroll compressor according to claim 1, wherein in the movable base plate, a concave portion that faces the main bearing is formed.

11. The scroll compressor according to claim 1, wherein the outer sliding member is a metallic collar that holds the inner sliding member, and
the inner sliding member is formed from a resin excellent in sliding characteristics, and has an inner layer that an inner circumferential surface configures the inner boundary zone, a back metal that is fixed to the outer sliding member, and a middle layer that bonds the inner layer and the back metal.

12. The scroll compressor according to claim 11, wherein the inner layer has a chamfer in at least one of both ends in the axial direction, and is made the inner boundary zone except for a portion to which the chamfer is applied.

13. The scroll compressor according to claim 11, wherein the collar has a chamfer in at least one of both ends in the axial direction, and is made the outer boundary zone except for a portion to which the chamfer is applied.

* * * * *